July 19, 1949.  F. P. BENNETT ET AL  2,476,797
AUTOMATIC SLIDE PROJECTOR
Filed Feb. 21, 1946  5 Sheets-Sheet 1

INVENTORS.
FRANK P. BENNETT,
GEORGE E. MUSEBECK.
BY
Lockwood, Goldsmith & Galt.
ATTORNEYS.

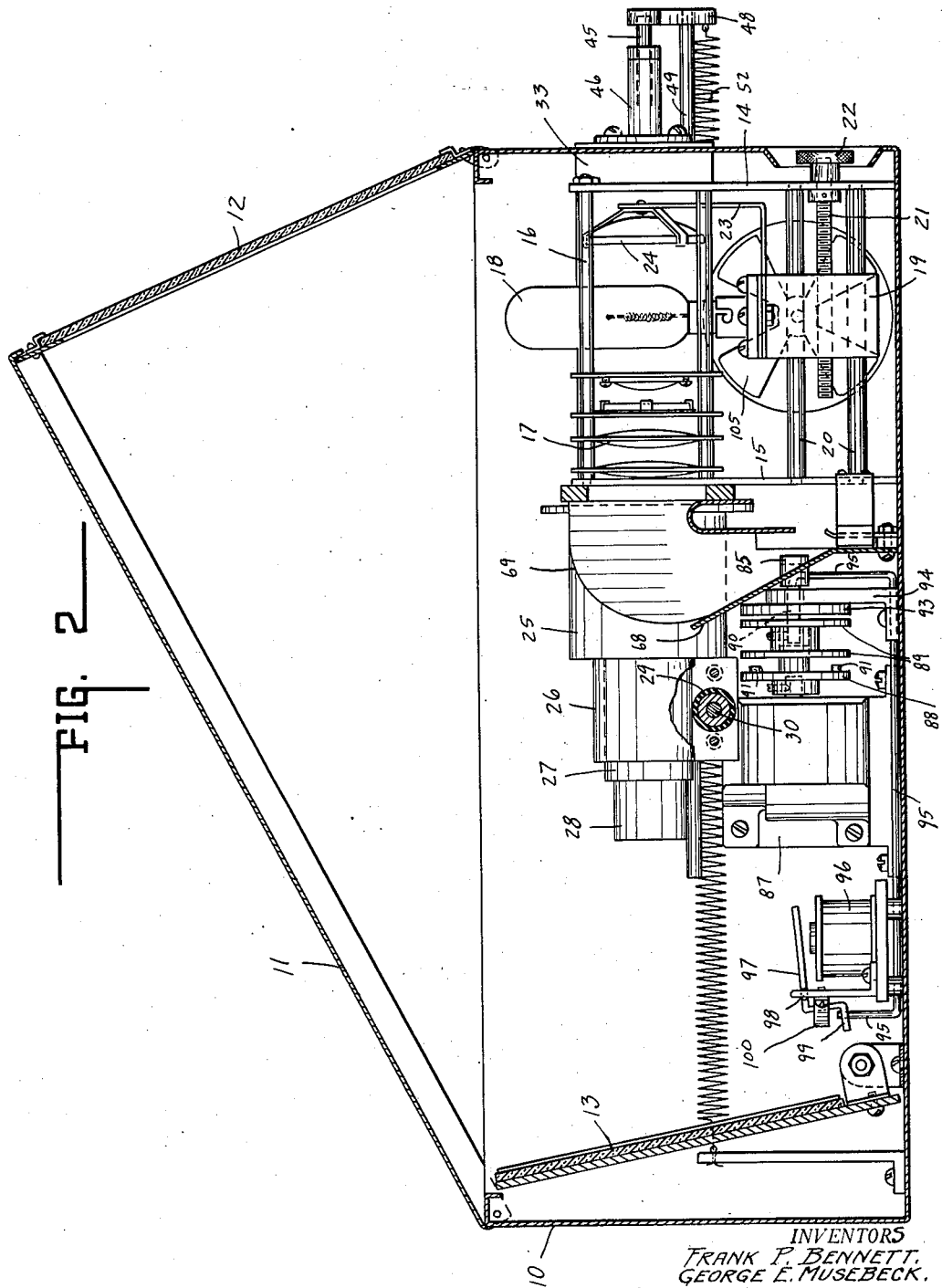

July 19, 1949. F. P. BENNETT ET AL 2,476,797
AUTOMATIC SLIDE PROJECTOR
Filed Feb. 21, 1946 5 Sheets-Sheet 3
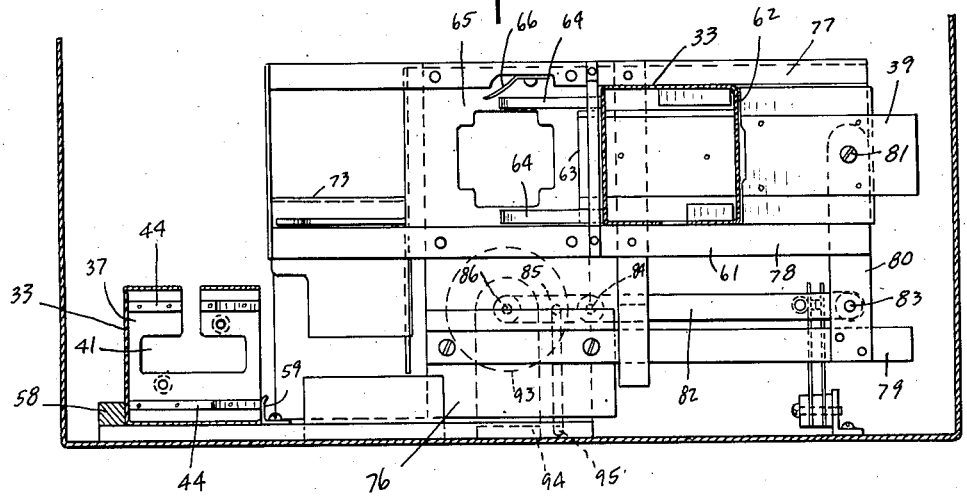
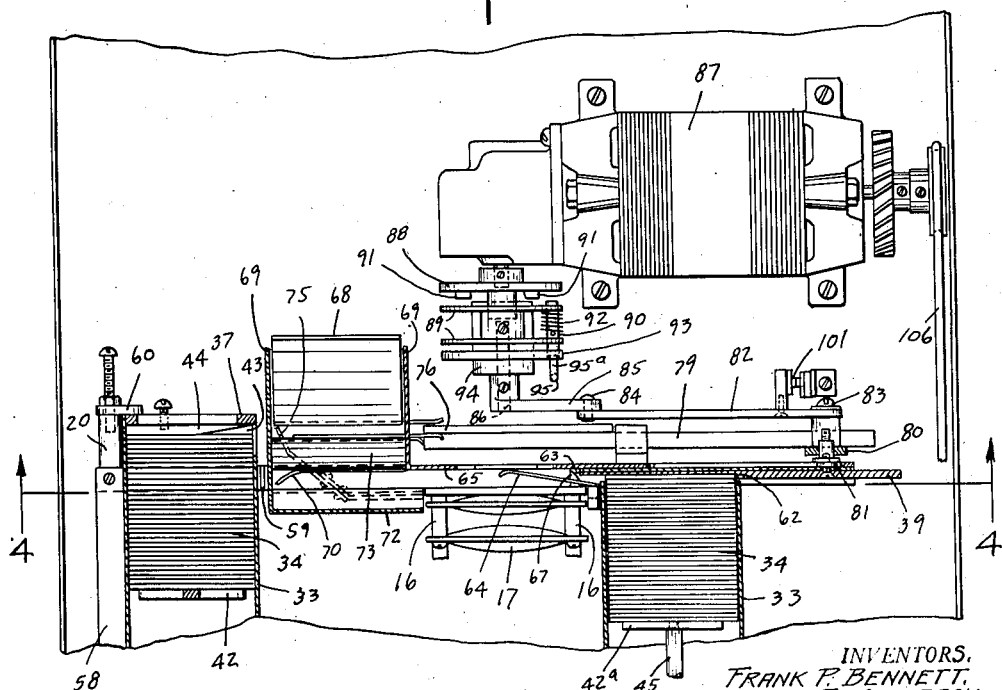
INVENTORS.
FRANK P. BENNETT,
GEORGE E. MUSEBECK.
BY
Lockwood, Goldsmith & Galt
ATTORNEYS.

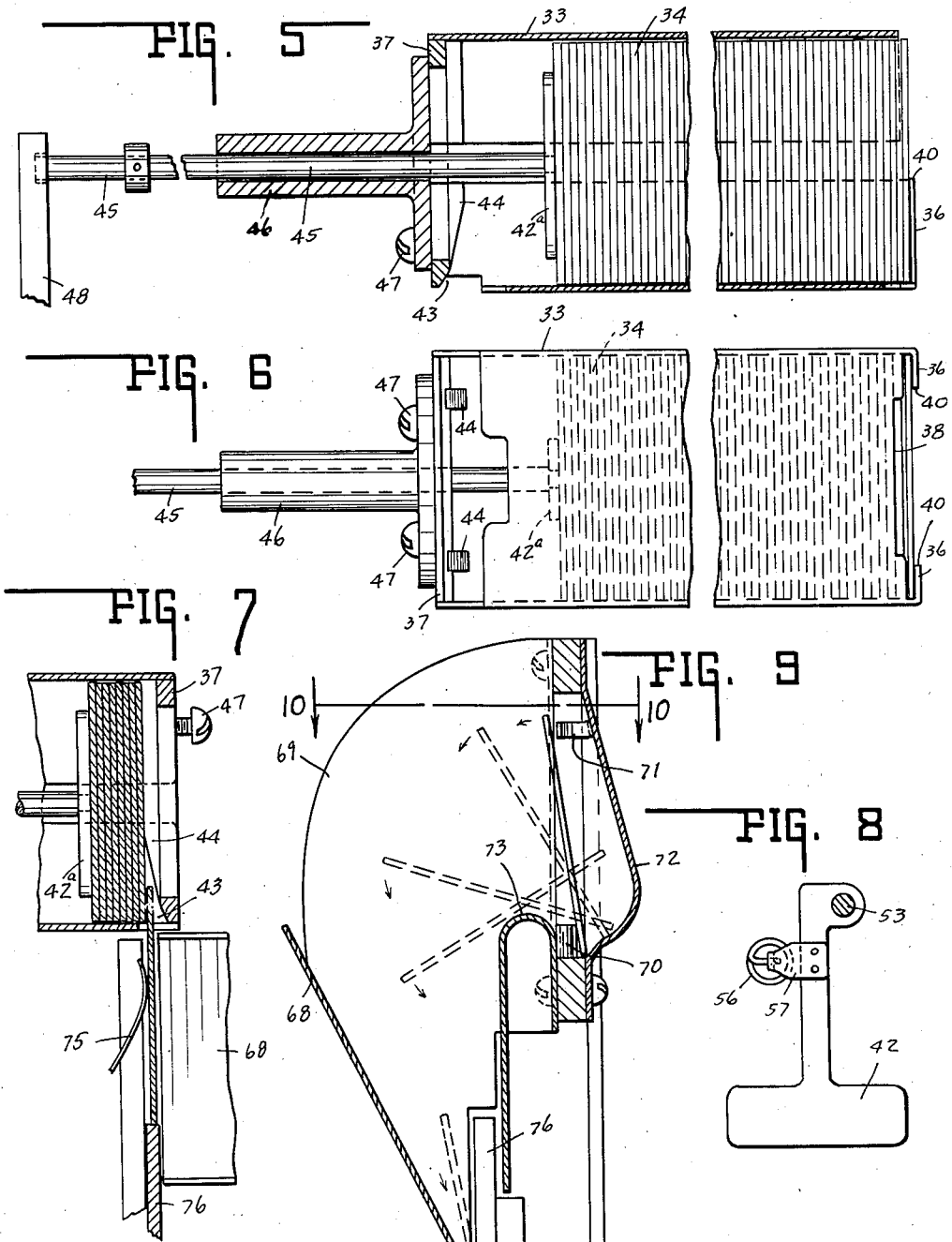

July 19, 1949.　　F. P. BENNETT ET AL　　2,476,797
AUTOMATIC SLIDE PROJECTOR
Filed Feb. 21, 1946　　5 Sheets-Sheet 5
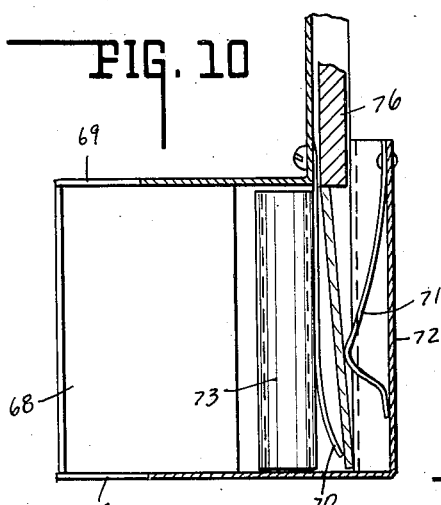
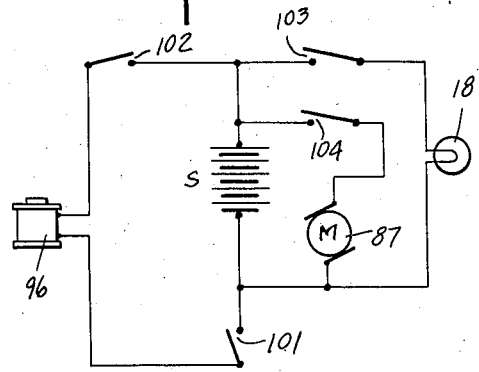
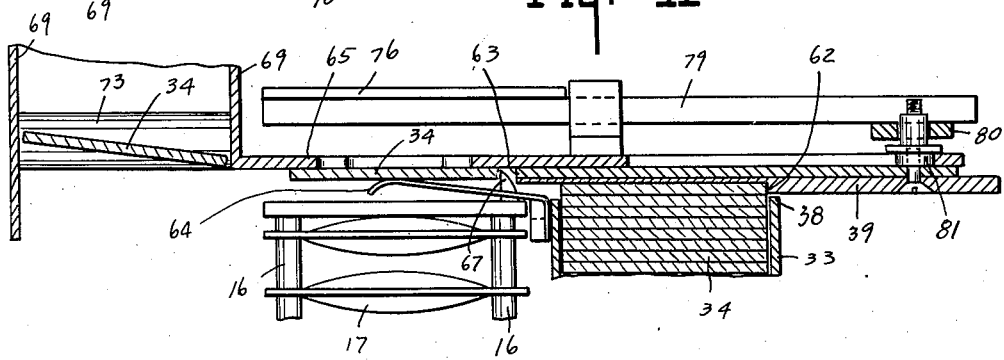
INVENTORS.
FRANK P. BENNETT,
GEORGE E. MUSEBECK.
BY Lockwood, Goldsmith & Galt
ATTORNEYS.

Patented July 19, 1949

2,476,797

UNITED STATES PATENT OFFICE 2,476,797

AUTOMATIC SLIDE PROJECTOR

Frank P. Bennett, Wilmette, and George E. Musebeck, Evanston, Ill., assignors, by mesne assignments, to Picture Recording Company, Chicago, Ill., a corporation Application February 21, 1946, Serial No. 649,135

9 Claims. (Cl. 88—28)

This invention relates to a picture projector, particularly one which is self-contained, portable and of light weight, although it is adaptable for permanent installation and other purposes.

The principal feature of the invention resides in the mechanism for automatically manipulating picture slides successively, transferring them from a magazine to projecting position and from projecting position to a second magazine, and whereby they are reversed during their transfer to the second magazine. By thus reversing them, the pictures are set up in the second magazine in such relative position that said second magazine may then be substituted for and take the place of the first magazine. Through this means the second or discharge magazine is reloaded with the projected slides ready for again passing through the projector, said magazines being interchangeable, whereby the magazine containing the projected slides may be conveniently placed in position for said slides to be again projected in their same order and arrangement as in the preceding projecting operation.

One feature of the invention resides in the follower devices mounted for maintaining the slides in a compact group as they are transferred from one magazine through the projecting apparatus to the other magazines. This is accomplished through a pair of biased follower plates slidably carried in each magazine.

Another feature of the invention resides in the slide reversing cage acting to receive and reverse a projected slide before replacing it in the magazine.

A further feature of the invention resides in the clutch control mechanism arranged to be manually operable exteriorly of the cabinet to change and initiate a slide changing cycle, said clutch being automatically operable to release at the completion of each slide changing cycle.

The full nature of the invention will be understood from the accompanying drawings and the following description and claims:

Fig. 2 is a central vertical section through the picture projector showing the top of the cabinet elevated to present a viewing screen.

Fig. 3 is a plan view of the magazines and slide shifting mechanism with the clutch controlled drive therefor, parts being removed or shown in section.

Fig. 4 is a section taken on the line 4—4 of Fig. 3.

Fig. 5 is a horizontal section through the magazine arranged for slide delivery to the projector.

Fig. 6 is a side elevation thereof.

Fig. 7 is a horizontal section through the reloading end of said magazine.

Fig. 8 is an elevational view of a slide follower plate.

Fig. 9 is a central vertical section through the slide reversing cage.

Fig. 10 is a view of the slide reversing cage taken on the line 10—10 of Fig. 9.

Fig. 11 is an enlarged schematic sectional view of the slide transfer mechanism.

Fig. 12 is a wiring diagram illustrative of the electric control therefor.

Figure 1:
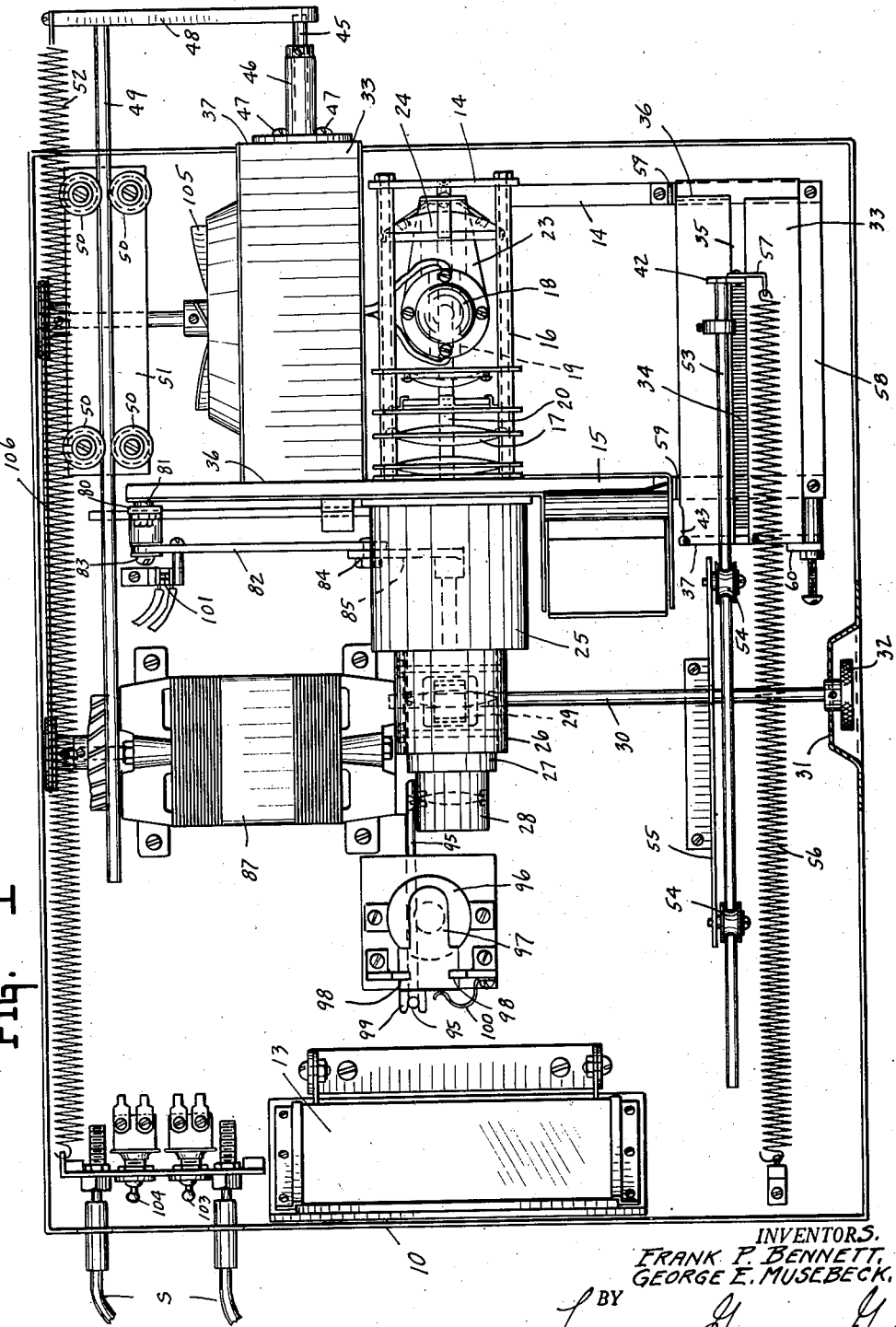
Fig. 1 is a plan view of the picture projector with the top of the cabinet removed.

In the drawings there is shown a projector supported within a cabinet 10 provided with a hinged top 11 which may be raised to support the hinged viewing screen 12 forwardly and above the cabinet to receive projected pictures reflected from the reflector 13 hinged rearwardly within the cabinet on the bottom thereof.

Housed within the cabinet there is an optical system carried by a framework including the end plates 14, 15 and cross rods 16. Adjusted on said cross rods there is a series of lenses 17 arranged rearwardly in horizontally spaced relation to the projector lamp 18. Said projector lamp is mounted upon a carriage 19 slidable upon the supporting bars 20 extending between the plates 14, 15 and adjustably slidable thereon by a screw 21 operable by a knurled head 22 exposed in a suitable recess provided in the forward end of the cabinet. Said carriage supports a bracket 23 carrying a reflector 24 for reflecting light rays through the series of lenses 17.

Rearwardly of the supporting plate 15 and mounted thereon, there is a hood 25 terminating in a reduced cylindrical housing 26 in which the lens barrel 27 is longitudinally adjustable, said barrel 27 carrying a reduced lens barrel 28. Rotatably mounted in said housing there is a rubber friction wheel 29 carried on a shaft 30 in frictional engagement with the lens barrel 27. Said shaft 30 extends laterally to the side of the cabinet with its outer end extending through an inwardly recessed portion 31 and rotatable by an exposed knob 32 for focusing the lenses mounted in the barrels 27, 28.

The picture slides to be projected are supported in face to face column formation in the magazines 33. As shown in Fig. 1, the uppermost magazine 33 is mounted in the cabinet for feeding the slides contained therein to the projector, and the lower magazine 33 of said figure is positioned to receive and be reloaded with the slides after their projection. As best illustrated in Figs. 5–7, the magazines 33 are elongated to receive a stacked column of slides, and in cross section conform to the size and shape thereof, herein shown as square. The magazines are each provided with an elongated slot 35, the side thereof embodying said slot being uppermost when the magazine is in reloading position (Fig. 1) and bottommost when in ejecting position (Figs. 5, 6 and 7).

The ejecting end, or the end of the magazine from which the pictures are removed for projection, is indicated at 36, whereas the reloading end of the magazine comprises plate 37. The end 36 is recessed at 38 to receive an ejecting pusher 39 slidable relative thereto for pushing the end slide 34 therefrom, as hereinafter described, said slides being retained against end displacement by the inwardly turned flanges 40. The reloading end of each of said magazines, including their respective end plates 37, are provided with openings 41 of such size and shape as to receive the biased follower plate 42, shown in Fig. 8, as well as the follower plate 42a, respectively. Adjacent the the end plate 37 the magazine is slotted on one side at 43 through which slot projected slides may be inserted for reloading, as shown in Figs. 1 and 3. Secured inwardly and adjacent the end plate 37 there is provided camming strips 44 for maintaining the loaded slides in spaced relation to the receiving slot 43 to provide a free opening for the incoming slides.

To retain the slides in their properly packed column formation while the magazines are being unloaded for projection or being loaded after projection, the follower plates 42, 42a are arranged to bear against the outermost slide under spring tension. For this purpose, when the magazine 33 is mounted for delivering slides to the projector (Figs. 5 and 6), the follower plate 42a is carried by a rod 45 slidably mounted in a bearing sleeve 46. Said bearing sleeve is provided with a head having a bayonet slot engagement with the screws 47 so that said sleeve may be quickly and conveniently attached to the end plate 37 with its follower plate 42a when the magazine is mounted for slide delivery. The rod 45 is releasably engaged by a laterally extending pressure arm 48 mounted upon a carrier rod 49 supported between a series of rollers 50 carried by a bracket 51 secured within the cabinet. The pressure arm is biased inwardly by a tension spring 52 to yieldingly exert pressure upon the follower plate such as to continuously move the column of slides forwardly as the foremost slide is removed from the magazine.

Similarly, when the magazine is positioned for reloading, the follower plate 42 mounted upon a carrier rod 53 is supported for longitudinal movement by the rollers 54, said rollers being rotatably mounted in a bracket 55 carried by the cabinet. A tension spring 56 is secured at one end to the cabinet and at the other end is hooked to a bracket 57 carried by the follower plate. Thus, during reloading the slides are retained in their column formation while making room for each additional slide inserted at the rear of the column.

The magazines are interchangeable in their mounting within the cabinet. As one of the magazines is emptied of its slide during the projection thereof, a companion magazine is loaded therein. The newly loaded magazine is removable by swinging the follower plate 42 from the free exposed end of the magazine upwardly about its rod 53. Such reloaded magazine may then be placed in storage or may be placed in position for delivering slides for projection. When the magazine is placed in slide projecting position, the follower plate 42a is inserted through the opening 41 in end plate 37, and its supporting bearing sleeve 46 has its head secured in position by the bayonet slot connection with screws 47. Thereupon the pressure arm 48 may be swung into position about its rod 49 for engagement with the rod 45 of said follower plate.

As shown in Fig. 4, the magazine 33 to be reloaded is mounted on the floor of the cabinet to seat between a locking bar 58 and a clamping spring 59 to butt up against a stop 60. When placed in position for removal of the slides therefrom for projection, said magazine is slid into position and supported by the framework indicated at 61.

In its projecting position, the end 36 of the magazine lies in the path of the ejecting pusher 39. Said pusher is provided with a shoulder 62 defining a recess into which the end slide seats under pressure of the spring 52 when the pusher is in its normal retracted position. The forward end of the pusher indicated at 63 is then in position to engage the slide which is in projecting position, in alignment with the optical system. As the pusher is reciprocated to the left, Figs. 3, 4, 10 and 11, two slides are simultaneously pushed thereby. The slide then in projecting position is pushed by the end 63 of the pusher out of said position into the reversing cage shown in Figs. 9 and 10. At the same time the shoulder 62 pushes the innermost slide of the magazine therefrom, in line with the optical system. As it is thus removed in line with the optical system, the springs 64, engaging the upper and lower edges of the slide, align it and hold it against an apertured plate 65. At the same time it is restrained by a downwardly extending spring 66 and latched against backward movement by a spring pressed latch 67 as the pusher returns to its initial position. Thus, the projected slide has been discharged and replaced by a new slide from the magazine as the pusher moves to the left and back again to normal position, comprising one cycle of operation.

Upon the projected slide being moved out of registry with the optical system, as above described, it drops down into the reversing cage, best illustrated in Figs. 9 and 10. Said cage is in the form of a trough having an outwardly flaring rear wall 68 and upwardly curved end walls 69. The slide slips laterally between a forwardly pressed spring 70 and a rearwardly pressed spring 71, the latter spring being mounted on a forwardly bulging housing plate 72. As soon as the slide is released in the cage, its bottom is forced forwardly by spring 70 and its top is forced backwardly by spring 71, causing it to trip over a tripping shoulder 73 and tumble into the trough guided by the rear wall 68 in the manner indicated by dotted lines in Fig. 9. Having reversed itself, or turned over within the cage, it slides to the bottom thereof to seat in vertical position within a recess 74 under tension of a spring 75. In this reverse position, the slide is then in alignment with the slot 43 of the magazine to be loaded and is slid along the back end of the column of previously loaded slides against the camming strips 44. In this action it forces the other slides outwardly to make room against the follower plate 42 and tension of spring 56. For this purpose there is provided a pusher 76 operating with the pusher 39. Thus, as the pusher 39 and pusher 76 are moved to the left, a new slide is moved into position, a projected slide is dropped into the reversing cage and the slide previously dropped therein is loaded in its reverse position at the rear of the column of slides in the reloading magazine.

As shown in Fig. 4, the pusher 39 is slidably supported between the guide plates 77 and 78. The pusher 76 is mounted on a bar 79. Rigidly secured to the bar 79 there is a cross bar 80 pivotally connected at 81 to the pusher 39. Said pushers 39 and 76 are, therefore, reciprocated by said bar through a link 82 pivotally connected thereto at 83. The link 82 is pivotally connected at 84 to a crank arm 85 keyed to a shaft 86 driven by a motor 87 through a releasable clutch. The crank arm 85 is normally in the position shown in Figs. 1, 3 and 4, with a slide in picture projecting position. Said crank arm makes one revolution per cycle of movement, coming to rest at the end of said cycle during which it has caused the pushers 39, 76 to move to the left and back again. During this movement they have replaced the slide being viewed and returned the reversed projected slide to the magazine being loaded. To arrest movement of the crank arm at the end of each cycle there is provided a clutch consisting of a disk 88 keyed to the motor shaft, which disk is freely rotatable in alignment with a flanged driving collar 89 which slidably carries a clutch pin 90. Said pin is movable forwardly into the path of rotation of a series of lugs 91 but biased out of said path by a spring 92.

The opposite end of the clutch pin normally engages and locks in the recess provided in the face of a stationary plate 93 carried by a bracket 94. The collar 89 is keyed to a stub shaft to which the crank arm 85 is keyed and having its bearing in the bracket 94. With the clutch pin seated in said recess under tension of its spring 92, it is out of the path of the lugs 91 so that the motor freely rotates without driving the crank arm 85. But when the pin is pressed inwardly momentarily to be engaged by a lug 91 and freed from its recess it will be held in lug-engaging position by the plate 93 until it is caused to make one revolution thereabout and again seat itself in its recess and be free of the lugs 91. Thus, said clutch may be tripped to drive the crank arm and the pushers through one cycle, whereupon they will come to rest.

The clutch pin 90 is operated through a magnetically actuated clutch rod 95 slidably mounted in the bottom of the housing and provided with a forwardly upstanding portion with an inturned end 95a extending in alignment with the clutch pin 90 to abut that end of said pin seated in the recess of the plate 93. When the clutch rod 95 is drawn rearwardly, it forces the clutch pin 90 out of said recess and into the path of movement of the lugs 91. In the meantime, the clutch rod 95 returns to its normal position, having initiated the cycle of movement of the clutch. For thus actuating the clutch rod, there is provided an electromagnet 96, as shown in Figs. 1 and 2, having an armature 97 fulcrumed at 98 and bent downwardly for engagement by the rod 95 at 99. Thus, when the magnet 96 is energized, its armature swings about its fulcrum to actuate the clutch rod 95 and initiate clutch engagement against the tension of a spring 100.

The driving link 82 carries a pin acting to close the contact member of switch 101 so that when the pushers are in their normal outward position, said switch 101 is closed, but upon operation thereof it is opened. As shown in Fig. 14, the said switch 101 maintains a circuit from the source S which is closed by a manually operated switch 102 to energize the magnet 96. Thus, through the conveniently located manual switch 102 the pushers may be operated to change a slide upon the closing thereof. The projected slide will then remain in position to be viewed on the screen until switch 102 is again closed. But switch 102 will not function to close the circuit except when the pushers are in normal position to close switch 101. Switch 101 also de-energizes the magnet as soon as the clutch operation becomes effective, irrespective of how long thereafter the manual switch is held closed. In circuit with said source of current there is also provided a switch 103 for closing the circuit to the lamp 18, and a switch 104 for closing the circuit from said source to the motor 87. For cooling the cabinet, the usual blower fan 105 is mounted to set up a current of air past the lamp, said fan being driven through a belt 106 by the motor 87.

The invention claimed is:

1. A picture projector including an optical system for receiving a picture slide to be projected, a pair of interchangeable magazines for containing said slides in vertical face to face column formation, a slide reversing cage, a reciprocating pusher operable to simultaneously transfer a projected slide from the optical system to drop into said reversing cage and from the ejecting end of one of said magazines into projecting position in said optical system, and a pusher operable with said first-mentioned pusher to simultaneously therewith transfer a reversed slide from said reversing cage to the loading end of the other of said magazines.

2. A picture projector including an optical system for receiving a picture slide to be projected, a pusher on one side of said system having its end engageable with one end of a projected slide for discharging it from said system and having a recess for receiving a replacement slide therefor with its edge engaged by a shoulder formed by the recess, a reversing cage at the opposite side of said optical system from said pusher for receiving the projected slide, means for actuating said pusher to simultaneously push the projected slide from said system into said cage and transfer an adjacent slide to said optical system for projection thereby, means in said reversing cage for causing the slide received therein to tumble downwardly into reversed position, and means for actuating said pusher for effecting the transfer of said slides and return it to initial position.

3. A picture projector including an optical system for receiving a picture slide to be projected, a pusher on one side of said system having its end engageable with one end of a projected slide for discharging it from said system and having a recess for receiving a replacement slide therefor with its edge engaged by a shoulder formed by the recess, a reversing cage at the opposite side of said optical system from said pusher for receiving the projected slide, means for actuating said pusher to simultaneously push the projected slide from said system into said cage and transfer an adjacent slide to said optical system for projection thereby, means in said reversing cage for causing the slide received therein to tumble downwardly into reversed position, a second pusher connected with said first-mentioned pusher to simultaneously eject a reversed slide from said cage with the transfer of the projected slide thereto, and means for actuating said pushers to transfer and eject said slides and return them to initial position.

4. A picture projector including an optical system for receiving a picture slide to be projected, a magazine having a reloading end, a reversing cage interposed between the reloading end of said magazine and said optical system, and a slide transfer mechanism operable to simultaneously discharge a projected slide from said system into said reversing cage and eject a slide from said reversing cage to the reloading end of said magazine in its reversed position.

5. A picture projector including an optical system for receiving a picture slide to be projected, a trough-like reversing cage mounted adjacent to and below said optical system having an angularly disposed wall, a tripping shoulder in said cage, a projection extending into said cage above said tripping shoulder, and means for transferring a slide from said optical system on edge with its lower edge forwardly of said shoulder and its upper edge rearwardly of said projection for tilting said slide and causing it to tumble over said shoulder with its upper edge foremost to be guided in reversed position by said angularly disposed wall to the lower portion thereof.

6. A picture projector including an optical system for receiving a picture slide to be projected, a trough-like reversing cage mounted adjacent to and below said optical system having an angularly disposed wall, a tripping shoulder in said cage, a projection extending into said cage above said tripping shoulder, means for transferring a slide from said optical system on edge with its lower edge forwardly of said shoulder and its upper edge rearwardly of said projection for tilting said slide and causing it to tumble over said shoulder with its upper edge foremost to be guided in reversed position by said angularly disposed wall to the lower portion thereof, and a yielding element in the lower portion of said cage for engaging and setting the reversed slide in vertical position.

7. A picture projector including an optical system for receiving a picture slide to be projected, a trough-like reversing cage mounted adjacent to and below said optical system having an angularly disposed wall, a tripping shoulder in said cage, a projection extending into said cage above said tripping shoulder, means for transferring a slide from said optical system on edge with its lower edge forwardly of said shoulder and its upper edge rearwardly of said projection for tilting said slide and causing it to tumble over said shoulder with its upper edge foremost to be guided in reversed position by said angularly disposed wall to the lower portion thereof, a yielding element in the lower portion of said cage for engaging and setting the reverse slide in vertical position, a magazine having a reloading end for said slides, and a pusher operable in the lower portion of said cage to push said slide in its reversed vertical position into the reloading end of said magazine.

8. A picture projector including an optical system for receiving a picture slide to be projected, a support on each side of said optical system for retaining a plurality of picture slides in vertical face to face column formation, the slide support on one side of said optical system having a slide ejecting end and the slide support on the opposite side of said system having a slide reloading end, a slide reversing cage including a deflector element for receiving a projected slide from said optical system and overturning it to reverse its position, and a slide transfer mechanism operable to simultaneously transfer the projected slide from said optical system to said reversing cage and from said ejecting end to said optical system.

9. A picture projector including an optical system for receiving a picture slide to be projected, a support on each side of said optical system for retaining a plurality of picture slides in vertical face to face column formation, the slide support on one side of said optical system having a slide ejecting end and the slide support on the opposite side of said system having a slide reloading end, a slide reversing cage including a deflector element for receiving a projected slide from said optical system and overturning it to reverse its position, a slide transfer mechanism operable to simultaneously transfer the projected slide from said optical system to said reversing cage and from said ejecting end to said optical system, and a member operable with said slide transfer mechanism to simultaneously therewith transfer the overturned slide from said reversing cage to said reloading end.

FRANK P. BENNETT.
GEORGE E. MUSEBECK.

REFERENCES CITED

The following references are of record in the file of this patent:

UNITED STATES PATENTS

| Number | Name | Date |
|---|---|---|
| 1,257,129 | Sheck | Feb. 19, 1918 |
| 1,437,112 | Lepine | Nov. 28, 1922 |
| 1,675,595 | Bouin | July 3, 1923 |
| 1,729,304 | Wagner | Sept. 24, 1929 |
| 2,022,903 | Thomas | Dec. 3, 1935 |
| 2,029,938 | Newman | Feb. 4, 1936 |
| 2,070,325 | Victor | Feb. 9, 1937 |
| 2,213,779 | Young | Sept. 3, 1940 |
| 2,231,395 | Schlegel | Feb. 11, 1941 |
| 2,242,464 | Githens et al. | May 20, 1941 |
| 2,260,660 | Darwin | Oct. 28, 1941 |
| 2,299,657 | Rystedt | Oct. 20, 1942 |
| 2,353,888 | Fuge | July 18, 1944 |
| 2,361,398 | Harris et al. | Oct. 31, 1944 |
| 2,363,820 | Warriner | Nov. 28, 1944 |
| 2,391,879 | Chambers | Jan. 1, 1946 |
| 2,401,506 | Pechkrantz | June 4, 1946 |